United States Patent [19]

Mosig et al.

[11] Patent Number: 5,738,506

[45] Date of Patent: Apr. 14, 1998

[54] MOTOR VEHICLE HEATING DEVICE

[75] Inventors: Ernst Mosig, Penzberg; Günter Kahnau, Starnberg, both of Germany; Shahrzad Rahbar, Thornhill, Canada; Helmut Schmitter, Burlington, Canada; Chris Kulaga, Mississauga, Canada; Frank David Williamson, Scarbouough, Canada

[73] Assignees: Webasto Thermosysteme GmbH, Stockdorf, Germany; Webasto Thermosystems Ltd., Burlington, Canada

[21] Appl. No.: 734,168

[22] Filed: Oct. 21, 1996

[30] Foreign Application Priority Data

Oct. 19, 1995 [DE] Germany ............. 195 38 947.6

[51] Int. Cl.⁶ .................................... F23N 5/24
[52] U.S. Cl. ....................... 431/90; 431/12; 431/18; 237/12.3 C
[58] Field of Search ............ 237/12.3 C, 12.3 A, 237/5; 431/12, 18, 90

[56] References Cited

U.S. PATENT DOCUMENTS

| 5,616,021 | 4/1997 | Onimaru et al. ............ 431/115 |
| 5,630,408 | 5/1997 | Versluis ..................... 126/351 |

*Primary Examiner*—Henry A. Bennett
*Assistant Examiner*—Derek S. Boles
*Attorney, Agent, or Firm*—Sixbey, Friedman, Leedom & Ferguson; David S. Safran

[57] ABSTRACT

The invention relates to motor vehicle heating device with a burner, to which combustion air is supplied via combustion air inlet openings by means of a fan and to which furthermore fuel gas is supplied via a fuel gas supply line, combustion air and fuel gas entering on the intake side of the fan. It is provided according to the invention for a simpler structure and good mixing of the fuel gas/combustion air mixture that entry of fuel gas is controlled by means of a valve or switch controlled by the negative pressure of the fan. Fuel gas is supplied in doing so, preferably, with a negative pressure which is less than atmospheric pressure. For especially simple control of gas supply, there is a membrane which causes the fuel gas supply line to close when the fan stops.

7 Claims, 2 Drawing Sheets

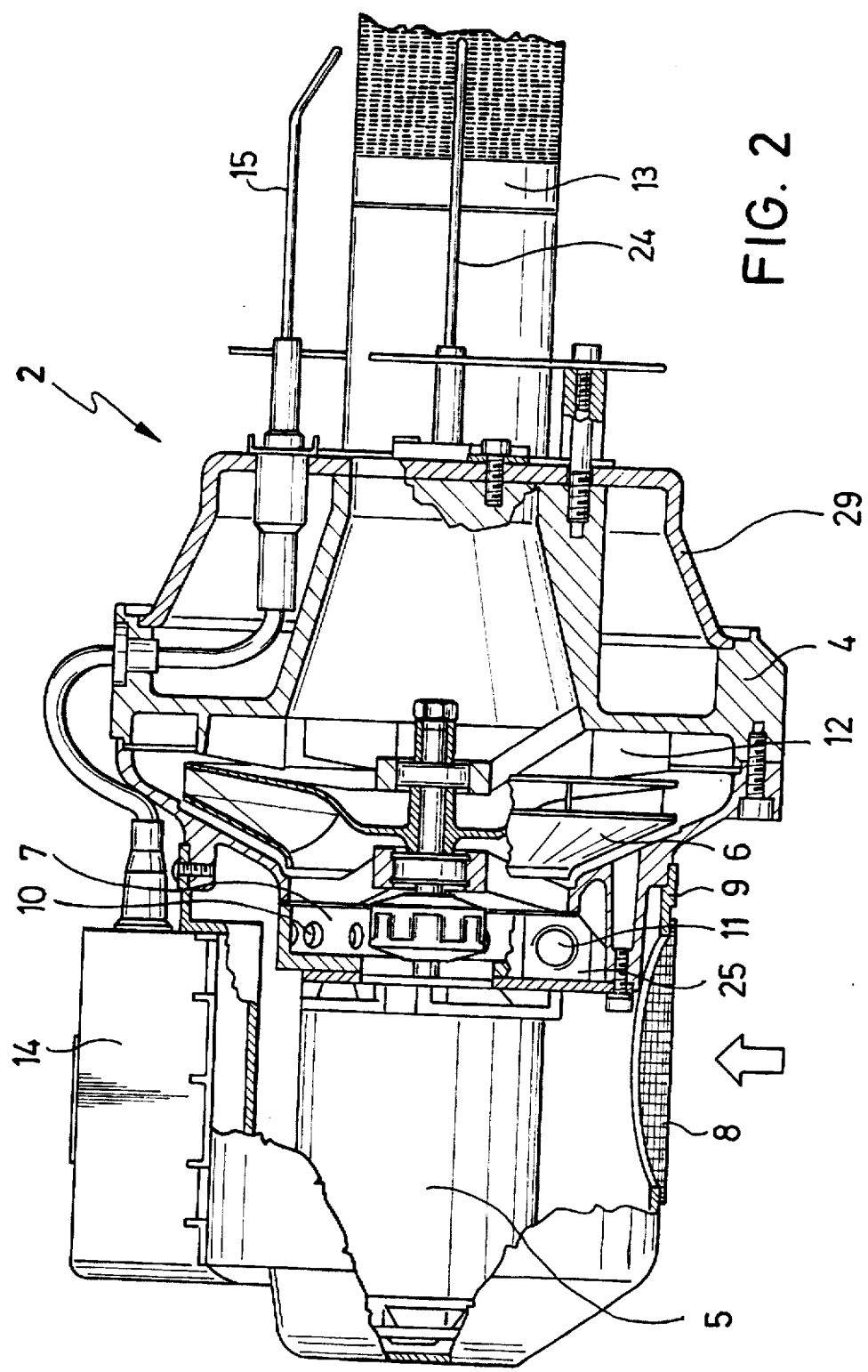

1

MOTOR VEHICLE HEATING DEVICE

BACKGROUND OF THE INVENTION

1. Field of the Invention

The invention relates to a motor vehicle heating device with a burner, to which combustion air is supplied via combustion air inlet openings by means of a fan and to which, furthermore, fuel gas is supplied via a fuel gas supply line More particularly, to such a heating device in which combustion air and fuel gas enter on the intake side of the fan, entry of the fuel gas being controlled by means of a valve or switch as a function of the differential pressure of the fan.

2. Description of Related Art

German Patent Application 39 11 268 A1 discloses a control means for a gas burner in which the differential pressure of a fan which delivers combustion air is used to activate a servo valve which, itself, is used to trigger a gas control valve that has a relatively complex structure.

A gas-fired water heater of the type to which the present invention is directed is known from German Patent Application 1 23 36 683. Typically, the fuel gas is supplied to the burner with a pressure which exceeds atmospheric pressure, so that a solenoid valve triggered by an electronic control device is essential to control the gas supply.

SUMMARY OF THE INVENTION

A primary object of the present invention is to devise a motor vehicle heating device with a burner in which production of the fuel gas/combustion air mixture is greatly simplified and improved.

According to a preferred embodiment of the invention, this object is achieved by providing the fuel gas in the fuel gas supply line with a negative pressure relative to atmospheric pressure and by providing a valve or switch directly adjoining the fuel gas supply line.

Because the entry of fuel gas is controlled by means of a valve or switch controlled by the negative pressure of the fan, a solenoid valve triggered by a control device is superfluous. Supply of fuel gas is controlled directly by the negative pressure generated on the intake side of the combustion air fan. This direct triggering by the fan also enables power control of the burner in a certain range, since in a corresponding configuration of the valve or switch, at elevated rpm, i.e., at increased intake-side negative pressure of the fan, a larger amount of gas can also be made available. On the other hand, the motor vehicle heating device offers an automatic high safety standard since, when the combustion air fan fails or is blocked, the pressure drop provides for immediate closing of the fuel gas inlet opening.

According to one especially simple embodiment, it is provided that the valve or the switch is actuated by means of a membrane which causes the fuel gas supply line to close when the fan stops or its rpm are very low. A switch of this type, configured with a membrane, can be manufactured especially economically. This embodiment is especially simple when the fuel gas at the fuel gas inlet opening has a negative pressure relative to atmospheric pressure of roughly 10 to 20 pa and when the membrane directly abuts the fuel gas inlet opening.

For especially good mixing of the fuel gas with the combustion air, it is advantageous if the fuel gas inlet opening located downstream of the fuel gas supply line and the combustion air inlet openings on a common mixing means discharge at an angle to one another. It has proven especially advantageous if the combustion air inlet openings discharge as radial holes into the mixing means, while the fuel gas inlet opening is made as a tangential hole.

Preparation of the combustion air/fuel gas mixture is additionally improved by the fact that a diffuser for swirling the mixture is provided between the fan and the combustion chamber and by the fact that the mixing means is protected from the heat radiated rearward from the combustion chamber by a heat shield.

These and further objects, features and advantages of the present invention will become apparent from the following description when taken in connection with the accompanying drawings which, for purposes of illustration only, show a single embodiment in accordance with the present invention.

BRIEF DESCRIPTION OF THE DRAWINGS

FIG. 2 shows an enlarged longitudinal section through the burner portion of the FIG. 1 heating device;

DETAILED DESCRIPTION OF THE PREFERRED EMBODIMENT

Figure 1:
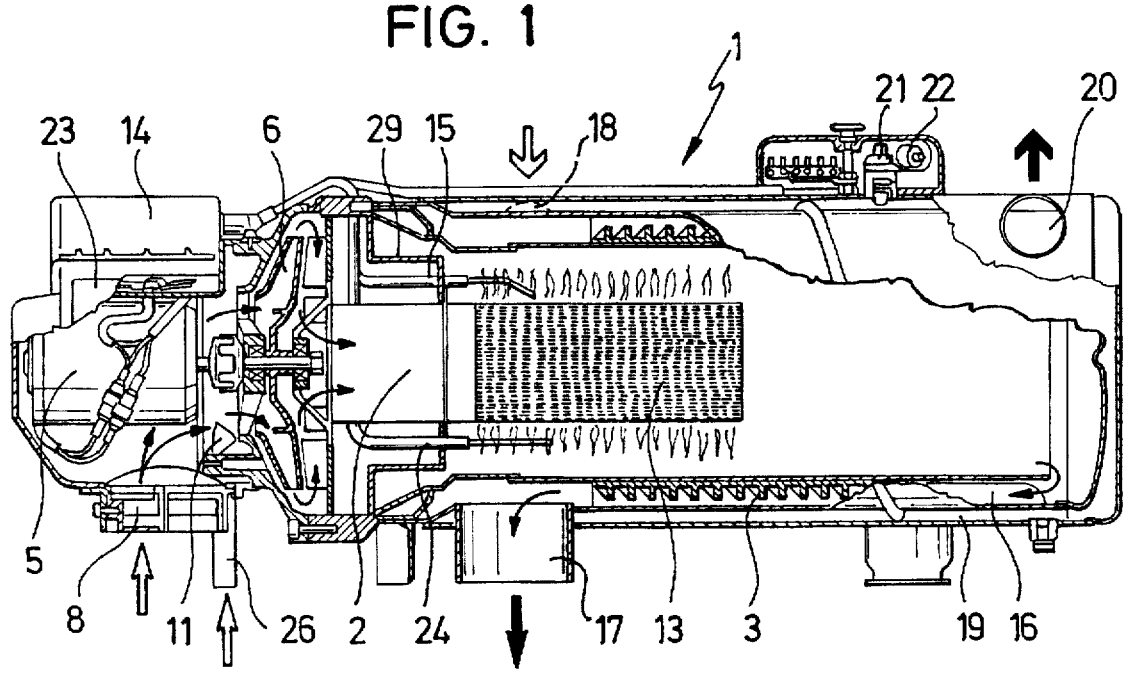
FIG. 1 shows a longitudinal section through a motor vehicle heating device in accordance with the present invention.
Figure 3:
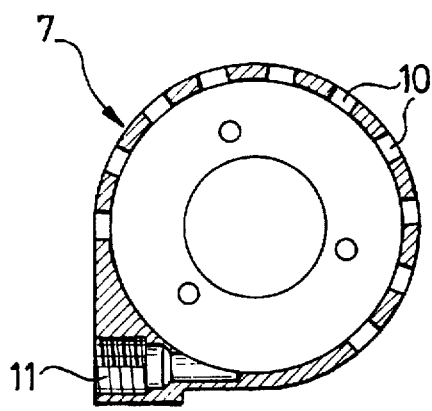
FIG. 3 shows a cross-sectional view through the mixing means of the burner portion of FIG. 2.

Motor vehicle heating device 1, as main components, has a burner 2 and a heat exchanger 3 which are joined to one another on a common flange part 4. In burner 2, there is an electric motor 5 which drives fan 6 for delivery of combustion air. On the intake side of fan 6, is a mixing means 7. The mixing means 7, on the one hand, is connected to a combustion air supply 8 which is provided in the outside wall of housing part 9 which surrounds electric motor 5 and mixing means 7. As detailed in FIG. 3, mixing means 7 is made as a flat cylindrical part with an outside wall through which extend several radially discharging combustion air inlet openings 10, which are joined to combustion air supply 8 within housing part 9. On the other hand, mixing means 7 is provided with a tangentially discharging fuel gas inlet opening 11. Combustion air inlet openings 10 and fuel gas inlet opening 11, thus, cause their respective flows intersect at a right angle to one another, by which especially good mixing is guaranteed.

Fuel gas inlet opening 11 is connected upstream to fuel gas supply line 26 via a negative pressure valve 25, which can also be made as a negative pressure switch.

A diffuser 12 is located on the pressure side of fan 6 to provide for additional swirling of the fuel gas/combustion air mixture. Downstream of the diffuser 12, a central opening 4a is provided in the flange part 4. Opening 4a tapers in the manner of a nozzle and leads to combustion chamber 13.

To ignite the fuel gas/combustion air mixture, an ignition electrode 15 is provided which is supplied with electrical energy via an ignition spark generator 14 which is located outside of housing part 9. Ignition electrode 15 extends parallel to the outer wall of the combustion chamber 13 which is provided with openings.

The fuel gases leave combustion chamber 13 on the end which is opposite flange part 4, where they are reversed and discharged from motor vehicle heating device 1 via an exhaust gas channel 16 and exhaust connection 17. In doing so, most of the thermal energy is extracted from the exhaust gases via the heat exchanger 3. For this reason, water flows through a water jacket 19 which surrounds the exhaust gas channel 16 in a spiral in counterflow, entering heat exchanger 3 via water inlet 18 and leaving motor vehicle heating device 1 at water outlet 20.

On the outside of the water jacket 19, an overheating safeguard 21 and thermostat 22 are provided which are joined to a control device 23. Furthermore, a flame monitor 24, which projects from flange part 4 centrally into the combustion chamber 13, is connected to the control device 23.

Figure 4:
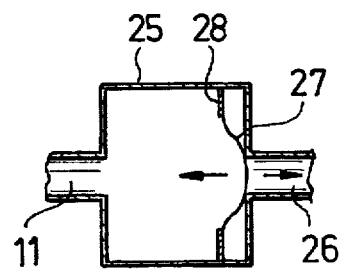
FIG. 4 is a schematic depiction of a negative pressure valve or switch for use in accordance with present invention.

The schematically depicted negative pressure valve 25 has a chamber into one side of which fuel gas supply line 26 discharges, and the other end of which is flow-connected to fuel gas inlet opening 11. Within the chamber, retainers 28 hold membrane 27 which, depending on the pressure conditions prevailing in the chamber, either abuts the mouth of fuel gas supply line 26 and blocks it, as shown in FIG. 4, having moved to the right (as represented by the arrow on the right side of membrane 27), or at a correspondingly strong intake pressure generated by fan 6, moves away from this opening to the left (as represented by the arrow on the left side of membrane 27), and in this way, enables the fuel gas to be supplied to fuel gas inlet opening 11.

The fuel gas is made available in fuel gas supply line 26 by repeatedly dropping the pressure by a pressure change Δp which is, preferably, 10–20 pa under atmospheric pressure. For this reason, when fan 6 stops or the fan rpm are very low, membrane 27 is automatically placed in front of the mouth of fuel gas supply line 26 and blocks it.

However, a version is equally possible in which the fuel gas in fuel gas supply line 26 is made available at a low overpressure, in which case the membrane 27 would be given a low elastic prestress which, in the absence of intake pressure by fan 6, causes the membrane to abut the mouth of the fuel gas supply line 26 to block it. The elastic prestress of membrane 27 is then such that it is overcome by developing intake pressure as rpm of the fan 6 increase, leading to increased lifting of membrane 27.

The supply of fuel gas which is controlled by the intake pressure of the fan 6, enables a simple structure for a motor vehicle heating device to be achieved. Furthermore, the intake-side supply of fuel gas, preferably under negative pressure, is subsequent mixing in mixing means 7, as well as subsequent chopping by fan 6 and additional swirling of the mixture in the diffuser 12, provide for outstanding preparation of the fuel gas/combustion air mixture which leads to excellent combustion values.

Between the combustion chamber 13 and the mixing means 7, a heat shield 29 is arranged. Heat shield 29 protects against the harmful effects of heat radiated rearward from the side of the combustion chamber and thereby makes possible a compact, integrated arrangement of the mixing means 7 in the vehicle heating device 1 in which the prepared mixture fee from large temperature fluctuations.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Motor vehicle heating device comprising a burner, a fan for supplying a mixture of combustion air and fuel to the burner, a fuel gas supply line for supplying fuel gas to an intake side of the fan, and pressure responsive flow control means for controlling delivery of the fuel gas from said supply line to said fan as a function of a pressure differential between the intake side of the fan and a delivery side of the fan; wherein the flow control means directly adjoins the fuel gas supply line and automatically terminates delivery of the fuel gas from said supply line to said intake side of the fan when said pressure differential is insufficient to produce a negative pressure at said intake side which is below atmospheric pressure by a predetermined amount.

2. Motor vehicle heating device according to claim 1, wherein said flow control means comprises one of a valve and a switch which has a membrane that causes the fuel gas supply line to close when fan rpm fall below a predetermined value.

3. Motor vehicle heating device according to claim 2, wherein the fuel gas supply line supplies fuel gas having a negative pressure of about 10 to 20 pa.

4. Motor vehicle heating device according to claim 1, further comprising a mixing means for mixing fuel gas from said fuel gas supply line with combustion air to produce a fuel gas/combustion air mixture; wherein said mixing means has combustion air inlet openings and a fuel gas inlet opening, said combustion air inlet openings being arranged at an angle relative to the fuel gas inlet opening which cause a flow of fuel gas entering the fuel gas inlet to intersect flows of combustion air entering from said combustion air inlet openings within the mixing means.

5. Motor vehicle heating device according to claim 4, wherein said combustion air inlet openings comprise radial holes in a wall of the mixing means surrounding a mixing chamber and the fuel gas inlet opening comprises a tangential hole in said wall.

6. Motor vehicle heating device according to claim 5, wherein a diffuser for swirling the fuel gas/combustion air mixture is disposed between the fan and the combustion chamber.

7. Motor vehicle heating device according to claim 4, wherein a heat shield is provided between the mixing means and the combustion chamber.

\* \* \* \* \*